United States Patent Office 3,459,050
Patented Aug. 5, 1969

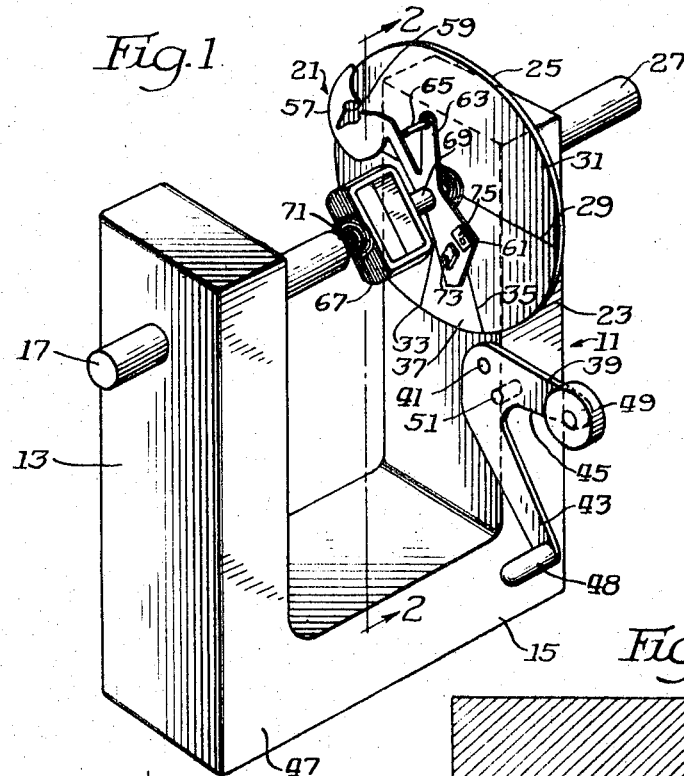

3,459,050
METER BLADE BALANCING MEANS USING PIVOTED WEIGHTS
Philip E. Uterhart, Park Ridge, Ill., assignor to Bell & Howell Company, Chicago, Ill., a corporation of Illinois
Filed July 21, 1966, Ser. No. 566,969
Int. Cl. G01m 1/00, 1/02
U.S. Cl. 73—480    1 Claim

ABSTRACT OF THE DISCLOSURE

A meter blade balancing system in which a meter assembly with a blade is statically balanced by attaching to the counterweight portion of the blade two small weights having integrally formed plug formations by which the weights can be staked to the blade after adjustment of the assembly into balanced condition using a fixture described.

---

The present invention relates to counterweighted, axially mounted members, and to methods and means for balancing such counterweighted members.

Members of the class with which the present invention is concerned may be used as moving pointer elements of sensitive measuring instruments. However, the invention is not thusly limited. To illustrate the disclosure herein, the description will be generally limited to an iris blade assembly such as that used in conjunction with a sensitive galvanometer in an automatic exposure control system for a camera and the like.

One type of prior known counterweighted construction of the referenced class includes members having portions to which adjustable balancing weights are secured. For the most part, such adjustable weights are secured in balancing attitude by glue, cement, welding, or riveting. Those procedures are not entirely satisfactory because weight fasteners or materials when applied to their counterweights members after balancing tend to unbalance them. In an attempt to solve the problem of upsetting counterweight balance resulting from addition of adhesive or cement, adjustment of balancing weights of some prior devices occurs after addition of fastening material which is permitted to dry after balancing weight adjustment. Such procedure is messy and also may result in unbalancing as adhesive or cement solvent evaporates.

In another heretofore known type of construction, the counterweighted members each comprise outwardly extending arms with longitudinally adjustable balancing weights frictionally attached by spring action or screw threads. These constructions, while not using adhesive type materials, are difficult and time-consuming to balance, requiring great skill and considerable experience for that critical and complex operation. That is because movement of any single balancing weight in either of the adjusting directions along the arm on which it is mounted tends to alter the equilibrium of its axially mounted counterweighted member in differing degrees and all orientations.

The disclosure herein teaches a novel and improved axially mountable counterweighted member, as well as a novel and an improved method for and apparatus to be used while balancing such counterweighted member. Basically, the novel counterweighted member comprises a part on which a pair of balancing weights are arranged for adjustment relative to an axis perpendicular to the axis about which the other of said weights is adjustable, with both of said last axes being disposed in a plane perpendicular to the rotational axis of the counterweighted member.

The foregoing permits achievement of one of the main objects of the instant invention which is the provision of a construction for members of the designated class, which can be balanced easily and accurately.

Another object of the invention is to provide a new and improved method for easily and accurately balancing counterweighted members of the indicated class.

A further object of the invention is to provide improved apparatus for holding counterweighted members during adjustment of their balancing weights.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of a novel holding apparatus which is shown being used to support, for balancing, a counterweighted member embodying a part of this invention.

FIG. 2 is a view taken on a plane designated by the line 2—2 of FIG. 1 and looking in the direction of the arrows, the back-up member of the holding apparatus being shown rotated about 90° from the position of FIG. 1, the counterweighted member being shown in several alternate positions in phantom and parts being shown dotted for the purpose of illustration.

FIG. 3 is a planar projection of the view taken substantially along the planes represented by broken lines 3—3 of FIG. 2 and looking in the direction of the arrows.

Referring now more particularly to the drawings, a holding apparatus comprising a U-shaped fixture generally designated 11 is defined by a pair of upright parallel sides 13 and 23 and an integral lower normal interconnecting section serving as a base 15. A pair of shafts 17 and 27 are secured in the sides 13 and 23, respectively with their proximate ends spaced apart and disposed in a line transversely of said sides to define a rotational axis 19 (FIG. 2). A counterweighted member herein shown in the form of an iris blade assembly generally designated 21 is axially mounted between the proximate ends of the shafts 17 and 27. Said shafts are fashioned to rotatably releaseably hold the assembly 21. The fixture mounts for the assembly 21 may comprise sockets formed in proximate ends of said shafts and adapted for conventional spring cushioned journals which are disposed along the axis 19. The preferred arrangement is such that the space generated between the proximate ends of the shafts 17 and 27 may be displaced more towards the side 23 than the other fixture side.

A reference disc 25 is secured in a vertical plane about the inner end portion of the shaft 27 adjacent and parallel to the inner face of the side 23. A horizontal diametric reference line 29 is inscribed on the inner face 31 of disc 25, thereby dividing the disc face 31 into a pair of semicircles. In the quadrants defining the lower semicircle, a pair of radial reference lines 33 and 35 are inscribed on the face 31 at an angle of about 15° from opposite sides of an imaginary diametric vertical line 28 shown in phantom in FIG. 2. Accordingly, there is provided an angle 37 of approximately 30° which is bisected by said vertical line 28.

An angular back-up member 39 is rockably mounted adjacent the inner face of the side 23. The rockable mounting is effected by a pivot 41 which is disposed below the indexing disc 25. The back-up member comprises a pair of arms 43 and 45 which are balanced to project forwardly from what is considered the front face 47 of said fixture 11. An operating handle 48 for manually rocking back-up member 39 is connected to the normally outer end portion of the other arm 45. A back-up disc 49 is rotatably mounted in the normally outer end portion of the other arm 45. The back-up disc 49, which is shown in inoperative position in FIG. 1, is arranged for rocking into operative position (shown in FIG. 2) between the reference disc 25 and assembly 21. As illustrated in FIG. 3, the back-up disc 49 has a flat face 53 and is proportioned and arranged so that, when it is rocked into its operative position, the flat face 53 will be spaced slightly from the thereto proximate flat 55 of the assembly 21 to the end that very slight pressure on the latter will cause frictional engagement and retention thereof by the back-up disc 49.

To limit inward movement of the back-up member 39 so that no more than a marginal part of the assembly 21 will be engaged by back-up disc 49, a boss 51 is secured to said member 39 and projects outwardly therefrom for engagement with the side 23, as clearly illustrated in FIGS. 2 and 3.

The assembly 21 comprises a iris blade 57 having an apertured end portion 59 and an integral counterbalancing portion 61 arranged in general diametric relationship relative to the rotational center of said blade. The blade 57 has an extension 63 which carries a conventional drive or connecting pin 65 the purpose of which is understood in the art but which is of no interest as far as the present invention is concerned.

The assembly 21 includes a conventional galvanometer coil 67 for actuating the blade 57 in a usual manner. The frame of coil 67 is rigidly carried on one end of a pin 69 which extends axially of the axis of rotation of the blade 57. The opposite end of said pin 69 is rigidly secured to said blade. A pair of axially aligned pivot pins 71, only one of which is clearly in evidence in FIG. 1, project in opposite directions from the assembly 21 for engagement in the journalling ends of the shafts 17 and 27 to thereby rotationally support said assembly 21 with blade 57 adjacent although spaced slightly from the reference disc 25.

The details of construction of said assembly 21, except to the extent, if any, otherwise indicated, are not intended as limiting on the present invention. What is significant, however, are a pair of adjustable weights 73 and 75 which are staked to the counterbalancing portion 61 of blade 57. In the present embodiment, the weights 73 and 75 are metallic rectangular plates of small dimensions which have been semiperforated to partially drive from end portions thereof, respectively, small cylindrical plugs or stakes 77 and 79 (FIG. 3). The counterbalancing portion 61 has a pair of spaced apart apertures 81 and 83 which are proportioned to accommodate projection therethrough of said stakes 77 and 79, respectively. Each of said stakes is proportioned for a snug but manually rotatable fit in its aperture, and is fashioned with an outer end portion which is flattened into a retaining head 85. The heads 85 and their corresponding of the weights 73 and 75 are disposed in frictional engagement for normal retention and manual rotation against opposite faces of the counterbalancing portion 61. Moreover, to the end that the weights 73 and 75 will not interfere with each other upon adjustment it is preferable that they be mounted against opposite faces of said counterbalancing portion, as clearly illustrated in FIG. 3.

The assembly 21 is proportioned so that when the weights 73 and 75 are arranged in their initial positions the blade 57 is balanced about its axis of rotation. The weight 73 is preferably proportioned so that it is in its initial position when its longitudinal axis is disposed at right angles to the longitudinal axis of the blade 57. The weight 75 is preferably proportioned so that it is in its initial position when its longitudinal axis is parallel to the longitudinal axis of the blade 57. Moreover, in the preferred embodiment, the weights 73 and 75 are substantially removed from the center of rotation of the blade 57, said weights being disposed as close to what might be considered the eccentric end of the counterbalancing portion 61 as is practical.

To determine the weight displacement within the assembly 21, it is mounted in fixture 11. When thusly mounted, provided it is perfectly balanced, it may well come to rest at any angular attitude about the axis 19. However, in accordance with the present invention, should the assembly not come to rest with the iris opening 60 of the end portion 59 above the index line 29, an operator will arrange the assembly by manual rotation so that it will assume such attitude, e.g. as shown in solid line in FIG. 2, as an initial position. This arrangement is possible even though the assembly 21 may not be in perfect balance inasmuch as it is relatively close to balance by reason of its construction and arrangement which has been calculated for perfect balance. Next, the assembly 21 is intentionally unbalanced by an operator in a manner which has been previously calculated under ideal circumstances to cause a perfectly balanced assembly 21 to rotate to a position in which the counterbalancing portion 61 is carried above the index line 29 so that the longitudinal axis of the blade 57 just overlaps with the line 28.

When employing a blade assembly 21 fashioned as in the illustrated embodiment, the intentional unbalancing step may be accomplished with a weight (not shown) of predetermined magnitude suspended by a thread 87 (FIG. 2) from the iris aperture 60. In actual practise an unbalancing weight of .0014 gram is calculated to rock a perfectly balanced assembly 21 proportioned as shown from an initial position (solid line of FIG. 2) to its position of intentional unbalance. If the assembly 21 alone is not balanced, the blade 57 will be swung during the unbalancing step so that its longitudinal axis does not overlap line 28.

The reference lines 33 and 35 define the limits of tolerance of unbalance in the assembly 21. Should longitudinal axis of the blade 57 fall beyond the limit defined by the reference lines 33 and 35 as a result of the unbalancing step, balancing adjustment of the weights 73 and 75, or one of them, can be made manually.

During balancing adjustment, the back-up member 39 should be rocked from the position shown in FIG. 1 to the position of FIG. 2. A slight manual pressure applied on the counterbalancing portion 61 to cause engagement thereof with the back-up disc 49 will immobilize the blade 57. The weights 73 and 75 may then be adjusted as required.

That is to say, for example, if as a result of the unbalancing step the blade 57 should have been rotated to the phantom line position referenced as A in FIG. 2, with its longitudinal axis slightly beyond the line 33, the weight 75 would be rotated in a manner such that the longitudinal axis of the blade would be brought within the tolerable limit lines 33 and 35. Rotation of the weight 75 causes shifting of the weight of counterbalance part about the vertical axis through and perpendicular to the axis 19. On the other hand, when, for example, as a result of the unbalancing step, the blade 57 assumes a dotted line position such as that herein referenced by B, weight adjustment of the counterbalancing part 61 will be made relative to a horizontal axis perpendicular to the axis 19 by rotationally adjusting the weight 73 to cause the blade portion 59 to be angularly displaced toward the line 33. Should adequate balancing adjustment be incapable of being made through employment of the weight 73, supplemental adjustment can be achieved by shifting the weight 75, to produce a result of the character aforedescribed.

As many substitutions or changes could be made in the above described construction and as many apparently widely different embodiments of the invention within the scope of the claims could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. An axially mountable member comprising a working part and a counterweight part arranged in diametric opposition to the working part;
   a pair of balancing weights having integrally formed plug formations by which said weights are adapted to be staked in adjusted position on said counterweight part,
   said plug formations forming adjustment axes for mounting of said weights for rotational adjustment about parallel axes and in a plane parallel to said counterweight part.

References Cited

UNITED STATES PATENTS

| | | | |
|---|---|---|---|
| 79,475 | 6/1868 | Jones | 74—573 XR |
| 1,097,862 | 5/1914 | Horstman | 74—573 XR |
| 2,045,677 | 6/1936 | Schock | 73—66 XR |
| 2,255,003 | 9/1941 | Rodanet | 116—136.5 |
| 2,721,475 | 10/1955 | Wallace | 73—480 |
| 3,157,051 | 11/1964 | Westfall | 73—480 |

FOREIGN PATENTS 528,177  10/1940  Great Britain.

JAMES J. GILL, Primary Examiner